United States Patent
Duan et al.

(10) Patent No.: US 10,049,101 B2
(45) Date of Patent: Aug. 14, 2018

(54) METHOD AND SYSTEM FOR PROCESSING SEMANTIC FRAGMENTS

(71) Applicant: International Business Machines Corporation, Armonk, NY (US)

(72) Inventors: Wei Hua Duan, Beijing (CN); Jia Ji, Beijing (CN); Jiang Lu, Beijing (CN); Wei Jie Wang, Beijing (CN); Qiang Xu, Vermont South (AU); Liang Xue, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 14/819,735

(22) Filed: Aug. 6, 2015

(65) Prior Publication Data
US 2016/0055147 A1    Feb. 25, 2016

(30) Foreign Application Priority Data
Aug. 20, 2014    (CN) .......................... 2014 1 0412445

(51) Int. Cl.
*G06F 17/27*    (2006.01)
(52) U.S. Cl.
CPC ................. *G06F 17/2785* (2013.01)
(58) Field of Classification Search
CPC ...................................................... G06F 17/27
USPC ........... 704/9; 33/9; 717/157, 146, 120, 110, 717/104; 707/715, 692
See application file for complete search history.

(56) References Cited

U.S. PATENT DOCUMENTS

| | | | | |
|---|---|---|---|---|
| 5,410,611 | A * | 4/1995 | Huttenlocher | G06K 9/32 382/177 |
| 8,566,789 | B2 * | 10/2013 | Siddaramappa | G06F 17/30908 707/706 |
| 8,676,627 | B2 | 3/2014 | Gerth et al. | |
| 9,158,503 | B2 * | 10/2015 | Misbhauddin | G06F 8/72 |

(Continued)

FOREIGN PATENT DOCUMENTS

| | | |
|---|---|---|
| CN | 102542406 A | 7/2012 |
| CN | 102591930 A | 7/2012 |
| CN | 103853559 A | 6/2014 |

OTHER PUBLICATIONS

Assy et al., "Assisting Business Process Design with Configurable Process Fragments", 2013 IEEE 10th International Conference on Services Computing, © 2013 IEEE DOI 10.1109/SCC.2013.97, pp. 535-542.

(Continued)

*Primary Examiner* — Michael Colucci
(74) *Attorney, Agent, or Firm* — David B. Woycechowsky (57) ABSTRACT

The present invention discloses a method and system for processing semantic fragments. Some embodiments of the present invention provides a method for processing semantic fragments. The method comprises: obtaining a plurality of groups of semantic fragments, the plurality of groups of semantic fragments at least including a first group of semantic fragments generated from a first data processing flow and a second group of semantic fragments generated from a second data processing flow, the first data processing flow being different from the second data processing flow; and merging the first group of semantic fragment and the second group of semantic fragment based on semantic equivalence. A corresponding system is also disclosed.

20 Claims, 4 Drawing Sheets

(56) References Cited

U.S. PATENT DOCUMENTS

| | | | |
|---|---|---|---|
| 2005/0192926 A1* | 9/2005 | Liu | G06N 5/02 |
| 2008/0104032 A1* | 5/2008 | Sarkar | G06F 17/3089 |
| 2010/0030726 A1* | 2/2010 | Chandrasekar | G06F 17/30911 707/715 |
| 2010/0057482 A1 | 3/2010 | Radhakrishnan et al. | |
| 2010/0318958 A1* | 12/2010 | Kuester | G06F 8/10 717/104 |
| 2011/0066634 A1* | 3/2011 | Phillips | G10L 15/22 707/769 |
| 2011/0078650 A1* | 3/2011 | Weber | G06Q 10/06 717/104 |
| 2011/0138373 A1* | 6/2011 | Lane | G06F 8/443 717/157 |
| 2011/0320416 A1* | 12/2011 | Kapoor | G06F 17/30578 707/692 |
| 2013/0007038 A1* | 1/2013 | Bose | G06F 17/30938 707/769 |
| 2013/0031536 A1* | 1/2013 | De | G06F 8/427 717/146 |
| 2013/0124927 A1* | 5/2013 | Balko | G06F 11/3604 714/48 |
| 2013/0139164 A1 | 5/2013 | Balko | |
| 2013/0226670 A1 | 8/2013 | Hernandez et al. | |
| 2014/0041030 A1* | 2/2014 | Call | G06F 21/55 726/22 |
| 2014/0108322 A1* | 4/2014 | Buchanan | G06N 5/02 706/50 |
| 2014/0137079 A1* | 5/2014 | Witteborg | G06F 8/71 717/120 |
| 2014/0297282 A1* | 10/2014 | Peters | G10L 15/19 704/254 |

OTHER PUBLICATIONS

Gerth et al., "Detection of Semantically Equivalent Fragments for Business Process Model Change Management", 3767 (# 99777) Feb. 25, 2010, Computer Science, pp. 1-18.

IBM et al., "Methodology and Tooling for Merging of Business Processes with Automated Correspondence Calculation", An IP.com Prior Art Database Technical Disclosure, Original Publication Date: Apr. 20, 2007, IP.com No. 000151093, IP.com, Electronic Publication: Apr. 20, 2007, pp. 1-8.

La Rosa et al., "Business Process Model Merging: An Approach to Business Process Consolidation", ACM Journal vol. V, No. N, Month 20YY, noted by inventor in Search Report dated May 14, 2013, pp. 1-20.

Ma et al., "Automatic merging of work items in business process management systems", W. Abramowicz (Ed.): BIS 2007, LNCS 4439, pp. 14-28, 2007. © Springer-Verlag Berlin Heidelberg 2007.

Duan et al., "Method and System for Processing Semantic Fragments", China Patent Application No. 201410412445.0, filed Aug. 20, 2014, (English translation), pp. 1-35.

Wei et al., "Unified model of multi-granularity manufacturing resource and its semantic service discovery", China Science Paper, vol. 8 No. 10, Oct. 2013, 6 pages.

\* cited by examiner

METHOD AND SYSTEM FOR PROCESSING SEMANTIC FRAGMENTS

BACKGROUND OF THE INVENTION

Embodiments of the present invention generally relates to the field of data processing, and more specifically, to a method and system for processing semantic fragments.

In most cases, data need to be processed according to predetermined steps or phases to accomplish a particular data processing task. These steps or phases for data processing are generally specified by a data processing flow. Specifically, the data processing flow may specify nodes for processing data, operations or activities performed for the data at these nodes, and data flow between the nodes, etc. The data processing flow may be parsed by a data processing engine for controlling data distribution and processing. For example, for traffic implemented in a digitalized manner, data related to the traffic may be processed hierarchically in a predetermined sequence between different personnel, departments and/or branches. A flow describing such data processing is called "traffic flow," which is one of examples of a data processing flow.

In order to complete different data processing tasks, it may be required to implement different data processing flows. Therefore, the amount of data processing flows could be huge. For example, there could be thousands of traffic flows associated with different traffics only in one mechanism. Moreover, many traffic flows may be heterogeneous, i.e., they involve different data processing nodes, operations and/or data flow paths. The huge amount and heterogeneity of the data processing flows may increase the complexity and load of data processing engines, which may affect the efficiency of data processing. Degradation of the data processing efficiency may in turn prolong the response time, which dampens user experience. Moreover, the maintenance difficulty associated with data processing flows and data processing engine may also increase.

In view of the above, there is a need in the art for a method of processing semantic fragments to merge a data processing flow in an appropriate manner.

SUMMARY

In general, embodiments of the present invention provide a technical solution for processing semantic fragments so as to merger data processing flows.

In one aspect, embodiments of the present invention provide a method for processing semantic fragments. The method may comprise: obtaining a plurality of groups of semantic fragments, the plurality of groups of semantic fragments at least including a first group of semantic fragments generated from a first data processing flow and a second group of semantic fragments generated from a second data processing flow, the first data processing flow being different from the second data processing flow; and merging the first group of semantic fragment and the second group of semantic fragment based on semantic equivalence.

In another aspect, embodiments of the present invention provide a system for processing semantic fragments. The system may comprise: a fragment obtaining unit configured to obtain a plurality of groups of semantic fragments, the plurality of groups of semantic fragments at least including a first group of semantic fragments generated from a first data processing flow and a second group of semantic fragments generated from a second data processing flow, the first data processing flow being different from the second data processing flow; and a fragment merging unit configured to merge the first group of semantic fragment and the second group of semantic fragment based on semantic equivalence.

It would be understood through the following description that according to the embodiments of the present invention, two or more data processing flows may be merged in a granularity of semantic fragments. Compared with directly merging the entire data processing flows, the semantic fragment-based merging can eliminate mutual interference between different semantic fragments and avoid taking into account too many mutually interfering factors during the merging process. Compared with the traditional solution, the embodiments of the present invention can achieve a better merging effect, e.g., decreasing the number of elements (e.g., activities) in the data processing flows more effectively. Other features and advantages of the present invention will become more comprehensible through the following description.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent.

In respective figures, same or like reference numerals are used to represent the same or like components.

DETAILED DESCRIPTION

Some preferable embodiments will be described in more detail with reference to the accompanying drawings, where the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
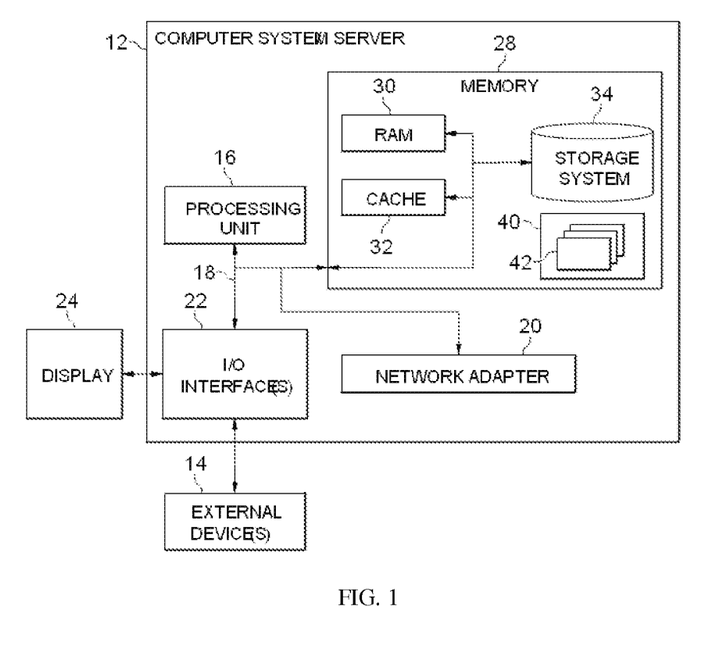
FIG. 1 is a block diagram depicting one example of a computing apparatus (i.e., computer) suitable for executing the methods disclosed herein.

FIG. 1 shows an exemplary computer system/server 12 which is applicable to implement the embodiments of the present invention. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention. A computer system readable medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Hereinafter, the mechanism and principle of the embodiments of the present invention will be described in detail. According to the embodiments of the present invention, a data processing flow may be expressed in any appropriate manner, including, but not limited to one or more of the following: extensive markup language (XML), pure text, tree, graph, table, and the like. In particular, when the data processing flow is a traffic flow, BPMN (Business Process Model and Notation) language, BPEL (Business Process Execution Language) language, XPDL (XML Process Definition Language), or any other appropriate format, may be used to represent a traffic flow.

In the context of the present disclosure, a basic unit forming a data processing flow is called an element. One data processing flow may comprise different types of elements. For example, in some embodiments, a type of elements of a data processing flow may be used to prescribe operations on data; while another type of elements may prescribe flow of data. As an example, in a traffic flow, a connection relationship between activities constitute an element of the traffic flow, wherein the activities are used to define operations on the data while the connection relationship is used to prescribe flow of data.

Additionally, if there is a data flow from element A to element B, then element A may be considered an upstream element of element B, while element B may similarly be considered a downstream element of element A. Therefore, a data processing flow may be regarded as a directional graph, wherein apexes in the graph represent data operations, while directional edges between apexes represent data flow.

Hereinafter, a mechanism for processing semantic fragments to merge data processing flows according to the embodiments of the present invention will be described with reference to FIG. 2. For the sake of clarity, in the description infra an embodiment of merging two data processing flows will be mainly discussed. However, it should be understood that it is only for the purpose of description, not intended for limiting the scope of the present invention. The embodiments of the present invention may be used to merge any number of data processing flows. Moreover, although merging of data processing flows may be described with reference to traffic flows in some embodiments infra, it is likewise exemplary. The embodiments of the present invention are applicable to merge any type of data processing flows, regardless of being currently known or future developed.

Additionally, unless otherwise stated, terms such as "first," "second," and "third" used hereinafter and in the claims are only for distinguishing different described objects, not intended to limit any temporal or spatial sequence. In addition, the term "based on" used hereinafter and in the claims expresses "at least partially based on." The term "comprise" or "include" or a similar expression indicates an open inclusion, i.e., "including, but not limited to . . . ." The term "plural" or a similar expression indicates "two or more." The term "some embodiments" indicates "at least some embodiments." The term "another embodiment" indicates "at least one another embodiment." Definitions of other terms will be provided in the description infra.

Figure 2:
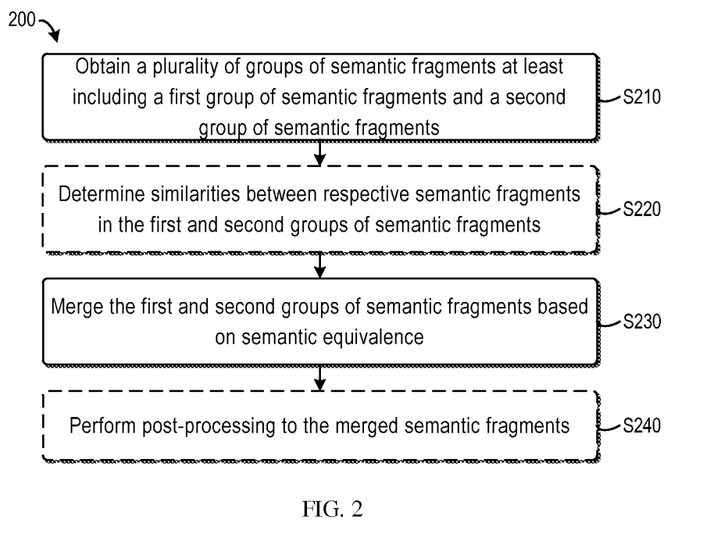
FIG. 2 is a flowchart depicting some embodiments of method for processing semantic fragments in accordance with the present invention.

FIG. 2 shows a flow diagram of a method 200 for processing semantic fragments according to the embodiments of the present invention. The method 200 starts from step S210 in which a plurality of groups of semantic fragments to be merged are obtained. Each group of semantic fragments may include one or more semantic fragments. For the convenience of discussion, suppose the plurality of groups of semantic fragments obtained in step S210 at least comprise a first group of semantic fragments and a second group of semantic fragments.

Each group of semantic fragments is generated from a corresponding data processing flow. For example, a first group of semantic fragments are generated from a first data processing flow, while a second group of semantic fragments are generated from a different second group of data processing flows. More specifically, according to the embodiments of the present invention, for any given data processing flow, the processing data flow may be partitioned based on semantic features of the elements in the data processing flow, thereby generating a group of semantic fragments. Embodiments of the partition operation will be described in detail infra.

It should be understood that generation and merging of semantic fragments may be performed by a same or different entities. Therefore, in some embodiments, the obtaining in step S210 may comprise receiving, from another entity, a first group of semantic fragments and/or a second group of semantic fragments, which are already generated. Alternatively, the obtaining in step S210 may comprise partitioning a first data processing flow locally to generate a first group of semantic fragments. Alternatively or additionally, a second group of semantic fragments may be generated by locally partitioning a second data processing flow. Moreover, the first group of semantic fragments and the second group of semantic fragments may be generated by the same or different entities. In particular, in some embodiments, a plurality of data processing flows may be partitioned in parallel to generate a plurality of groups of semantic fragments.

Hereinafter, it will be discussed how to generate a group of semantic fragments through partitioning a data processing flow. First, in some embodiments, the data processing flow may be subject to format conversion before the partitioning operation. For example, in some embodiments, all to-be-partitioned data processing flows may be converted into a uniform or compatible format. As an example, when the data processing flow is a traffic flow, BPMN or other appropriate language may be used to represent all traffic flows. This practice is advantageous to enhance the accuracy and efficiency of subsequent processing.

As mentioned above, according to the embodiments of the present invention, partitioning of the data processing flow may be implemented based on semantic features of respective elements in the data processing flow. A "semantic feature" of an element refers to an attribute or factor of the element associated with data processing semantics. Each element may have one or more semantic features. For example, examples of a semantic feature may include, but not limited to, a performing subject of data processing, processing time, processing location, security level, resource requirement, etc.

As a specific example, in a data processing flow used for integrated circuit testing description of a to-be-tested circuit chip likely has to go through testing in different phases and/or different levels. For example, the testing process may include testing on different objects such as wiring, layout, pins, encapsulation, and the like. In this case, factors such as testing object, tester level, testing time constraint and the like may be used as semantic features. As another example, in data distributive processing, factors such as machine type, computation capability, storage resource, network segment as located, and security level of each node for processing data may be regarded as semantic features. It should be understood that the examples described here are only for the purpose of illustration, not intended to limit the scope of the present invention. Any factors associated with data processing operations may be regarded as semantic features.

In some embodiments, one or more semantic features common to respective elements in a to-be-partitioned data processing flow may be used for partitioning. Specifically, for given one or more semantic features, elements having the same or similar semantic feature values may be partitioned to one semantic fragment, while elements with different semantic feature values may be partitioned into different semantic fragments.

Only for the sake of discussion, the above described example of circuit testing may be still considered. In this example, a testing object may be selected as a semantic feature for partitioning a data processing flow. Therefore, elements corresponding to tests for the same object are partitioned into the same semantic fragment, while elements corresponding to tests for different objects are partitioned into a different semantic fragment.

In particular, dependent different roles or contributions of different elements for data processing, the elements in the first data processing flow may be divided into primary elements and auxiliary elements. For example, in some embodiments, elements prescribing operations on data may act as primary elements, while elements prescribing data flow may act as auxiliary elements. For example, in a traffic flow, activities may act as primary elements, while connection relationships between activities may act as auxiliary elements.

Correspondingly, in some embodiments, at step S210, a first data processing flow may be partitioned only based on the semantic features of primary elements. Specifically, at least one boundary element among the primary elements may be determined first based on semantic features. In some embodiments, boundary elements refer to those primary elements whose semantic feature values are changed compared with adjacent primary elements. In particular, the start and end of the data processing flow may be regarded as boundary elements. Next, the first data processing flow may be partitioned based on the boundary elements.

Specifically, in some embodiments, the primary elements may be first partitioned into a corresponding group. Classification of the primary elements starts from a boundary element, such that boundary elements adjacent to each other but having different semantic feature values are partitioned into different groups. In particular, any two boundary elements having different semantic feature values will not be partitioned into the same group. However, adjacent boundary elements having the same semantic feature values may be partitioned into the same group. Other primary elements are partitioned into a group according to the connection relationships and semantic feature values. Specifically, in some embodiments, all primary elements between two boundary elements in the same group may be partitioned into the group. Afterwards, each auxiliary element may be partitioned into a corresponding group based its connection relationship with a primary element, thereby obtaining the partitioned semantic fragments.

Figure 3:
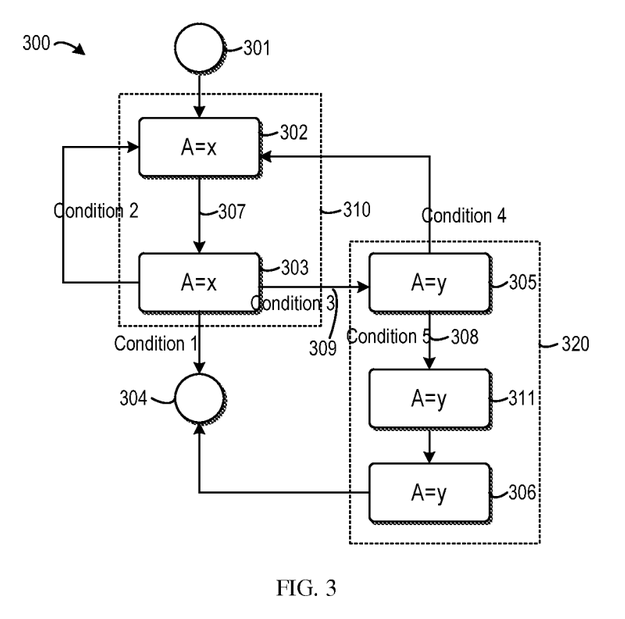
FIG. 3 is a schematic diagram depicting some embodiments of partitioning a data processing flow into semantic fragments in accordance with the present invention.

As an example, with reference to FIG. 3, where an example of partitioning a data processing flow based on semantic features of primary elements is presented. In the example of FIG. 3, the data processing flow 300 starts from 301 and data are first processed at element 302. Then, data are transmitted to element 303. At step 303, if "condition 1" is satisfied, the data processing flow 300 ends at 304; if "condition 2" is satisfied, the data are transmitted back to element 302; if "condition 3" is satisfied, the data are transmitted back to element 305. At element 305, if "condition 4" is satisfied, the data are transmitted back to element 302; if "condition 5" is satisfied, the data are transmitted sequentially to elements 311 and 316, and the data processing flow 300 then ends at 304.

In the example shown in FIG. 3, suppose elements 302, 303, 305, 306, and 311 are defined as primary elements and are all associated with the semantic feature A. moreover, suppose the value of the semantic feature A of the elements 302 and 303 is x, and the value of semantic feature A of elements 305, 306, and 311 is y. particularly, the start element 310 and the end element 304 may be regarded as special primary elements, whose semantic values are different from any other primary element. By detecting changes of semantic feature values along a data flow direction of the data processing flow 300, it may be determined that elements 302, 303, 305, and 306 are boundary elements. Therefore, elements 302 and 303 may be partitioned into one semantic fragment 310, because although both of elements 302 and 303 are boundary elements, their semantic feature values are identical. Moreover, since the boundary elements 305 and 306 are partitioned into one semantic fragment 320, the primary elements between the two boundary elements should also be partitioned into the semantic fragment 320.

In this example, a directional connection between elements is defined as an auxiliary element. Such connections may be partitioned into a corresponding semantic fragment based on their association with the primary elements. For example, the connection 307 is associated with primary elements 302 and 303, such that it may be partitioned to the semantic fragment 310 where the two primary elements are located. Similarly, the connection 308 is associated with primary elements 305 and 306, which may therefore be partitioned to the semantic fragment 320.

In particular, as shown in the figure, the connection 309 is associated with two boundary elements 303 and 305. In some embodiments, the connection 309 may be partitioned into either one of the semantic fragments 310 and 320. Alternatively, in another embodiment, it is also allowed not to partition the connection line 309 to any semantic fragment.

Although the example of FIG. 3 only uses a single semantic feature A to partition the data processing flow 300, it is only exemplary, not intended to limit the protection scope in any manner. As mentioned above, more than one semantic feature may be used to partition the first data processing flow. In this embodiment, when and only when the values of the two elements with respect to the values of all such semantic features, can the two elements are partitioned to the same semantic fragment.

Moreover, in some embodiments, when generating a semantic fragment, any other rules or constraints may be taken into account. For example, in some embodiments, occurrence of loops and the like in semantic fragments should be avoided at best. Alternatively or additionally, in some embodiments, a user may be allowed to designate a plurality of primary elements as boundary elements.

It would be appreciated that during generating semantic fragments by partitioning the first data process flow, data association likely exists between some semantic fragments. For example, in the example of FIG. 3, according to the data processing flow 300, data may flow from element 303 to element 305. Therefore, data flow exists between the two elements 303 and 305. Likewise, data flow exists between element 305 and element 302. In some embodiments, corresponding semantic fragments may be associated based on such data flow between semantic fragments.

The association between semantic flows may be implemented through any appropriate manner. For example, such association may be saved as metadata. Alternatively or additionally, in some embodiments, a corresponding attribute may be added to elements in a semantic fragment which have data flow with other semantic fragment, to indicate such data flow. In some embodiments, an attribute for indicating one or more data inlets and/or one or more data outlets may be added to an interface element, wherein the data inlets and data outlets are associated with interface elements in other fragments.

For example, in the example shown in FIG. 3, a data inlet attribute may be added to the element 305 so as to designate the element 303 as a data inlet of the element 305. Meanwhile, a data outlet attribute may be added to the element 305 so as to designate the element 302 as a data outlet of the element 305. It should be noted that, in this example, although the element 305 only has one data inlet and one data outlet, it is only for the purpose of illustration. According to some embodiments of the present invention, one element may have a plurality of data inlets and/or a plurality of data outlet. In other words, the partitioned semantic fragments support multi-in and/or multi-out data flow, which is beneficial to a processing logic of a data processing flow.

By associating the semantic fragments based on data flow, change or loss of original logic and semantics of the data processing flow may be avoided during the generating and merging of semantic fragments. For example, when reconstructing a data processing flow based on the merged semantic fragments later, such association of semantic fragments may be implemented in a reconstructed data processing flow. In this way, the integrity and correctness of the processing logic of the data processing flow can be effectively guaranteed.

Continue reference to FIG. 2, in some embodiments, the method 200 proceeds to step S220, where similarities between respective semantic fragments in the first and second groups of semantic fragments to be merged are determined.

In some embodiments, when measuring the similarities of semantic fragments, closeness degree between semantic feature values of respective elements in a fragment may be considered. Specifically, for a given semantic feature, the closer the semantic feature values of two elements are, the more similar are the two elements. Alternatively or additionally, when weighing similarity between semantic fragments, closeness degree of the semantic fragments in one or more other aspects may also be considered, e.g., including, but not limited to, one or more of the following: connection relationship between elements, branch condition in the semantic fragments, length of semantic fragments, etc.

Actually, as mentioned above, each semantic fragment may be regarded as a directional graph. Therefore, in some embodiments, a similarity between any two semantic fragments may be determined by comparing a similarity between topologies or structures of directional graphs. In this aspect, any technique capable of comparing similarity between graphs may be used in conjunction with the embodiments of the present invention, regardless of whether such technique is currently known or future developed. For example, in some embodiments, a hierarchical clustering algorithm may be used to compute a similarity score between graphs.

In this way, in step S220, similarities between respective semantic fragments in the first group of semantic fragments and respective semantic fragments in the second group of semantic fragments may be determined. Suppose the first group of semantic fragments include m semantic fragments, while the second group of semantic fragments include n semantic fragments. In some embodiments, in step S220, a m*n similarity table may be generated, wherein each entry $T_{ij}$ indicates a similarity between a semantic fragment i from the first group and a semantic fragment j from the second group. The similarity may be quantitative number (e.g., similarity score) or qualitative description.

It should be understood that it is only exemplary to use a table to indicate similarities between semantic fragments. According to the embodiments of the present invention, seminaries between respective semantic fragments in more than two groups of semantic fragments may be compared simultaneously. In this case, in step S220, any appropriate multi-dimensional data structure may be used to indicate the similarities.

Determining similarities between semantic fragments in step S220 is for merging the first group of semantic fragments and the second group of semantic fragments more effectively and efficiently. It has been provided that an optimized result can be achieved by merging semantic fragments in different groups according to the similarities in a descending order. However, it should be noted that step S220 is optional (shown in dotted-line block in FIG. 2). In other words, in some embodiments, the first and second group of semantic fragments may be merged without performing similarity ranking.

Next, the method 200 proceeds to step S230, where the first group of semantic fragments and the second group of semantic fragments are merged based on semantic equivalence. In the context of the present disclosure, merging the first group of semantic fragments and the second group of semantic fragments refers to merging at least one semantic fragment from the first group and at least one semantic fragment from the second group.

In some embodiments, if the similarities between respective semantic fragments in the first and second groups of semantic fragments have been determined in step S220, in step S230, the semantic fragments may be merged based on the similarities in a descending order. In other words, a pair of semantic fragments with the highest similarity in the two groups of semantic fragments are first merged, and then a pair of semantic fragments with a second highest priority are merged, and so on and so forth. In particular, in some embodiments, a similarity threshold may be set, such that only semantic fragment pairs having a similarity higher than the threshold are merged. In this way, the times of the merging operation can be significantly reduced, thereby enhancing the merging efficiency.

Of course, as mentioned above, it may not be compulsory to merge semantic fragments according to the order of similarities. In an alternative embodiment, the first group of semantic fragments and the second group of semantic fragments may be directly merged. For example, one semantic fragment may be selected from the first group of semantic fragments and the second group of semantic fragments, respectively, for being merged. The semantic fragments may be selected randomly or sequentially.

Hereinafter, semantic equivalence-based semantic fragment merging will be discussed. According to the embodiments of the present invention, merging of any two semantic fragments is performed at a unit of element. In other words, the semantic equivalence between semantic fragments is determined based on the semantic equivalence between elements. In order to weigh the semantic equivalence between elements, one or more semantic features of elements may be selected as criteria. In some embodiments, all semantic features of elements may be considered in the merging process. Alternatively, it is also allowed to only use a given subset of semantic features of elements.

According to the embodiments of the present invention, semantic equivalence between elements at least may comprise equivalence in literal value and equivalence in substantive meaning. Specifically, for each semantic feature, if the semantic feature values of two elements are completely identical, it may be regarded that the two elements are semantically equivalent literally. Therefore, the two elements may be merged into one element.

If the literal values of the semantic features of two elements are different, but their substantive meanings are identical, the two elements may also be regarded as semantically equivalent. Therefore, such elements may also be merged. The semantic substantive equivalence may be defined in advance. For example, for each semantic feature considered in the merging operation, one or more groups of values of the semantic feature may be defined. Although the values in each group seem different, the meanings represented thereby are substantively identical. In this way, if the semantic feature values of two elements fall within the same set, they are regarded as substantively equivalent semantically.

As an example, suppose a semantic feature of an element is "processing priority." For this feature, the following set of semantic feature values may be defined: A={top high, very high, processing in priority, emergency}, B={high, very high, emergency}, C={general, common, normal}. Suppose the "processing priority" of the first element from the first semantic fragment is "top high," while the "processing priority" of the second element from the second semantic fragment is "emergency," then it is believed that the two elements are substantively equivalent in the semantic feature "processing priority."

As mentioned above, elements in a semantic fragment may include primary elements and auxiliary elements. Therefore, in some embodiments, merging of semantic fragments in step S230 may be driven by primary elements. Specifically, in such embodiment, two primary elements which match most semantically from within the to-be-merged semantic fragments are first found out. Then, the two primary elements are merged. Next, other elements in the two semantic fragments are successively merged based on the connection relationships.

Figure 4:
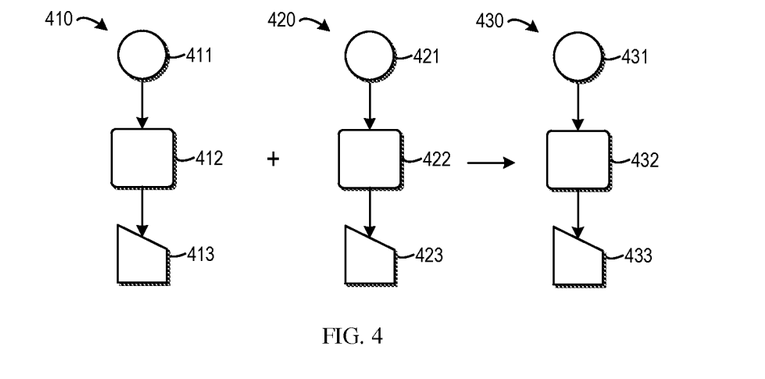
FIGS. 4-7 are schematic diagrams depicting several embodiments of merging semantic fragments in accordance with the present invention.

Merging of two semantic segments include a plurality of scenarios. For example, in some embodiments, all elements in two semantic fragments are semantically equivalent. At this point, the two semantic fragments may be completely merged into one. With reference to FIG. 4, the first semantic fragment 410 and the second semantic fragment 420 are to-be-merged semantic fragments. In this example, a primary element 411 in the semantic fragment 410 and a primary element 421 in the semantic fragment 420 are semantically equivalent, and therefore are first merged into element 431. Afterwards, according to the connection relationships, primary elements 412 and 422 are processed. In this example, suppose elements 412 and 422 are also semantically equivalent, such that the two elements 412 and 422 are merged into element 432. Similarly, semantically equivalent elements 413 and 423 may be merged into element 432. Similarly, semantically equivalent elements 413 and 423 may be merged into the semantic element 433. In this way, a merged third semantic fragment 430 is obtained, including semantic elements 431, 432, and 433.

Figure 5:
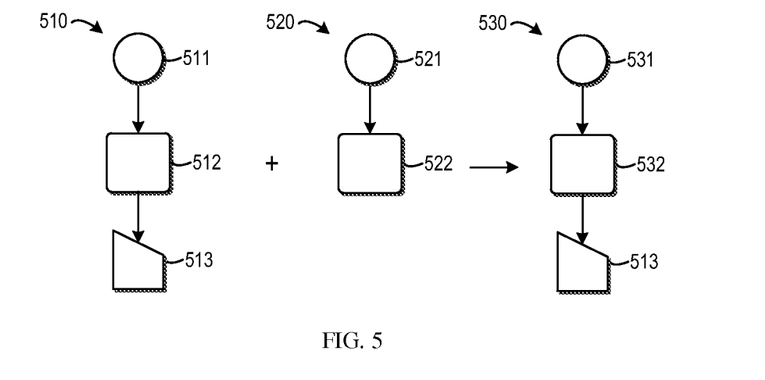

Alternatively or additionally, in some embodiments, merging of two semantic fragments comprises one semantic fragment absorbs the other. As an example, FIG. 5 shows to-be-merged first semantic fragment 510 and second semantic fragment 520. In this example, suppose elements 511 and 521 are semantically equivalent, and 512 and 522 are semantically equivalent. At this point, in the merged third semantic fragment 530, element 531 is obtained from merging elements 511 and 521, element 532 is obtained from merging 512 and 522, while element 513 is obtained from the semantic fragment 510.

In particular, in some cases, two semantic fragments might be partially equivalent semantically. In other words, in the two semantic fragments, some elements are semantically equivalent and thus may be merged, while other elements are semantically different and thus cannot be merged. In this case, according to the embodiments of the present invention, branch may be used to implement merging of semantic fragments. It will be appreciated through the description below that by flexibly using branch, semantic fragments that originally could not be merged can be effectively merged.

Figure 6A:
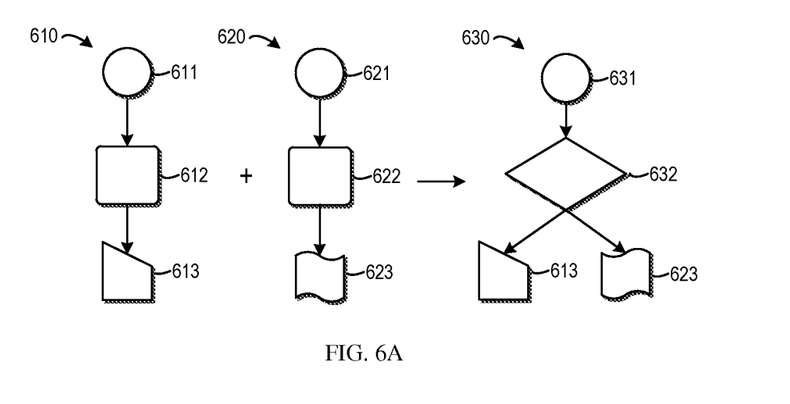

Refer to FIG. 6A, where an example of merging semantic fragments using a branch is presented. In this example, for to-be-merged first semantic fragment 610 and second semantic fragment 620, elements 611 and 621 are semantically equivalent and thus can be merged into element 631. Elements 612 and 622 are semantically equivalent, but their respective downstream elements 613 and 623 are not semantically equivalent to each other. According to the embodiments of the present invention, elements 612 and 622 can be merged into element 632. In particular, in this example, the merged element 632 is created as a branch element in the third semantic fragment 630. Next, the respective downstream elements 613 and 623 are inserted into the third semantic fragment 630 as downstream elements of the branch element 632.

Figure 6B:
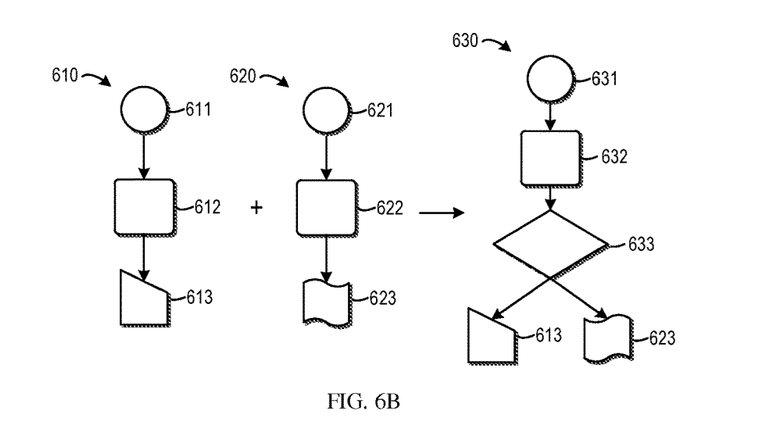

Alternatively, in another embodiment, as shown in FIG. 6B, the merged element 632 may also be kept unchanged. In this case, a newly created branch element 633 may be inserted after the merged element 632, and the elements 613 and 623 are inserted into the third semantic fragment 630 as downstream elements of the merged element 632 by use of the branch element 633. It will be appreciated that the embodiment of FIG. 6A is a specific implementation of the embodiment of FIG. 6B. In other words, in the embodiment of FIG. 6A, the merged element 632 is directly created as a branch element. If it is desired that the number of elements in the merged semantic fragment is as less as possible, the embodiment of FIG. 6A may be adopted.

Figure 7:
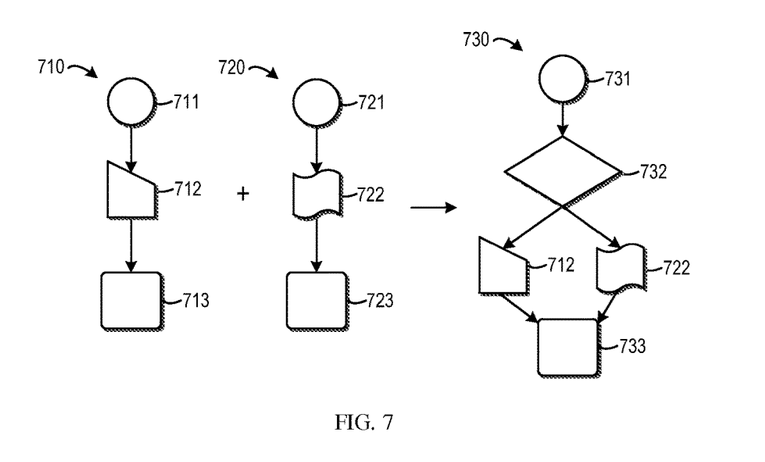

FIG. 7 shows another scenario of using a branch. In the example of FIG. 7, an element 711 in the first semantic segment 710 and an element 721 in the second semantic fragment 720 are equivalent and thus can be merged into an element 731. The elements 712 and 722 are not semantically equivalent to each other, but their respective downstream elements 713 and 723 are semantically equivalent. In this case, in some embodiments, equivalent elements 712 and 722 are inserted into a third semantic fragment 730 as downstream elements of the branch element 732. Then, the equivalent downstream elements 713 and 723 are merged into an element 733. In the third semantic fragment 730, the element 733 is a downstream element common to elements 712 and 722.

By performing step S230, a plurality of semantic fragments from a plurality of data processing flows can be effectively merged. It has been provided that by lowering the merging granularity to semantic fragments, rather than directly merging the data processing flows, the number of elements can be reduced more effectively, which facilitates streamlining and integration of different data processing flows, thereby enhancing data processing efficiency and quality.

Continue reference to FIG. 2, in some embodiments, in step S240, any appropriate post-processing may be performed to the merged semantic fragments. For example, in some embodiments, based on associations in the original data processing flows and/or the data associations generated in the partitioning operation, the merged plurality of semantic fragments may be re-jointed into a data processing flow.

Specifically, in some embodiments, for a to-be-reconstructed data processing flow, the previously partitioned semantic fragments may be re-connected based on the connection relationships between the semantic fragments, starting from the initial semantic fragment. If a semantic fragment has already been merged with a semantic fragment of other data processing flow in the merging process, the merged semantic fragment may be used to replace the original semantic fragment. During the reconstruction process, based on the data associations generated during the partitioning, nodes with the presence of data flow in the semantic fragments may be connected. In this way, it may be ensured that the re-constructed data processing flow has a correct processing logic.

Alternatively or additionally, in some embodiments, in step S240, a backbone of one or more data processing flows (e.g., the first data processing flow and/or second data processing flow) may be extracted based on a result of merging. Here, the term "backbone" as used refers to logic or step having universality in the data processing flows.

As mentioned above, in some embodiments, the first data processing flow may be merged with one or more other data processing flows based on semantic fragments. Through the result of comparing and merging, if it is found that one or more elements (e.g., primary elements) in the first data processing flow cannot be merged with most of other data processing flows, it may be regarded that these elements have certain peculiarity. Correspondingly, these peculiar elements may be removed from the corresponding data processing flows. A data processing flow with the peculiar element being removed is called a backbone of the original data processing flow. For the removed element, an appropriate remedying processing may be adopted to guarantee integrity of the data processing flow. The remedying processing may comprise: generating a simulated processing result of the removed element. Alternatively, the remedying processing may also include prompting the user to perform manual interference, and the like.

Extracting of the backbone of a data processing flow facilitates normalization of the same kind of data processing flows. For example, within one institution or organization, upgrade of a traffic flow may be realized only by revising the backbone of the traffic flow. Each branch institution or department may correspondingly upgrade peculiar elements according to the actual needs, and/or appropriately adjust the flow backbone to realize one or more special activities. In this way, management efficiency of data processing flows can be enhanced, while the burden of administrators of data processing flows can be relieved.

Figure 8:
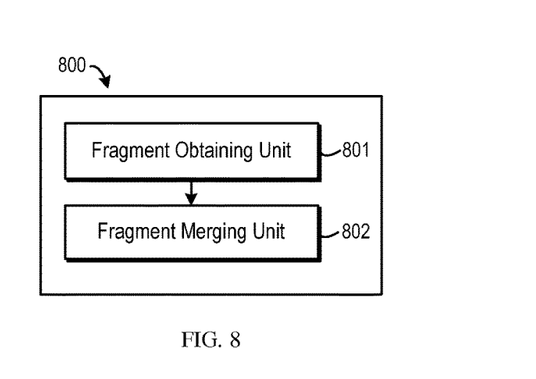
FIG. 8 is a schematic block diagram depicting some embodiments of a system for processing semantic fragments in accordance with the present invention.

FIG. 8 shows a schematic block diagram of a system 800 for processing semantic fragments according to the embodiments of the present invention. As shown in the figure, the system 800 comprises: a fragment obtaining unit 801 configured to obtain a plurality of groups of semantic fragments, the plurality of groups of semantic fragments at least including a first group of semantic fragments generated from a first data processing flow and a second group of semantic fragments generated from a second data processing flow, the first data processing flow being different from the second data processing flow; and a fragment merging unit 802 configured to merge the first group of semantic fragment and the second group of semantic fragment based on semantic equivalence.

In some embodiments, the fragment obtaining unit 801 may comprises a fragment partitioning unit configured to partition the first data processing flow into the first group of semantic fragments based on semantic features of elements in the first data processing flow.

In some embodiments, the elements in the first data processing flow include primary elements and auxiliary elements connecting the primary elements. In this embodiment, the fragment partitioning unit comprises: a boundary element determining unit configured to determine at least one boundary element from the primary elements based on the semantic features of the primary elements; a primary element partitioning unit configured to partition the primary elements into different groups based on the at least one boundary element; and an auxiliary element partitioning unit configured to partition the auxiliary elements to the groups based on connection between the primary elements and the auxiliary elements, to generate the first group of semantic fragments.

In some embodiments, the fragment partitioning unit comprises: a fragment associating unit configured to associate semantic fragments with data flow in the first group of semantic fragments for reconstruction of the first data processing flow.

In some embodiments, the system 800 may further comprise: a similarity determining unit configured to determine similarities between semantic fragments in the first group of semantic fragments and semantic fragments in the second group of semantic fragments. In this embodiment, the fragment merging unit is configured to merge the first group of semantic fragments and the second group of semantic fragments based on an order of the similarities.

In some embodiments, the fragment merging unit 802 may comprise: a branch-based merging unit configured to merge a first semantic fragment in the first group of semantic fragments and a second semantic fragment in the second group of semantic fragments into a third semantic fragment by generating a branch.

In some embodiments, the branch-based merging unit comprises: a first element merging unit configured to, responsive to a first element in the first semantic fragment being semantically equivalent to a second element in the second semantic fragment while a first downstream element of the first element in the first semantic fragment being not semantically equivalent to a second downstream element of the second element in the second semantic fragment, merge the first element and the second element into a third element in the third semantic fragment; and a first element inserting unit configured to use a branch element to insert the first downstream element and the second downstream element into the third semantic fragment as downstream elements of the third element. Particularly, in some embodiments, the first element merging unit comprises a first branch creating unit configured to create the branch element as the third element.

In some embodiments, the branch-based merging unit may comprise: a second branch creating unit configured to, responsive to a first element in the first semantic fragment being not semantically equivalent to a second element in the second semantic fragment while a first downstream element of the first element in the first semantic fragment being semantically equivalent to a second downstream element of the second element in the second semantic fragment, create a branch element in the third semantic fragment; a second element inserting unit configured to insert the first element and the second element into the third semantic fragment as downstream elements of the branch element; and an element merging unit configured to merge the first downstream element and the second downstream element into the third semantic fragment as a downstream element common to the first element and the second element.

In some embodiments, the system 800 may further comprise: a backbone extracting unit configured to extract a backbone of at least one of the first data processing flow and the second data processing flow based on a result of the merging.

It should be noted that for the sake of clarity, FIG. 8 does not show optional units or sub-units included in the system 800. All features and operations as described above are suitable for system 800, respectively, which are therefore not detailed here. Moreover, partitioning of units or subunits in system 800 is exemplary, rather than limitative, intended to describe its main functions or operations logically. A function of one unit may be implemented by a plurality of other units; on the contrary, a plurality of units may be implemented by one unit. The scope of the present invention is not limited in this aspect.

Moreover, the units included in the system 800 may be implemented by various manners, including software, hardware, firmware or a random combination thereof. For example, in some embodiments, the apparatus may be implemented by software and/or firmware. Alternatively or additionally, the system 800 may be implemented partially or completely based on hardware. for example, one or more units in the system 800 may be implemented as an integrated circuit (IC) chip, an application-specific integrated circuit (ASIC), a system on chip (SOC), a field programmable gate array (FPGA), etc. The scope of the present intention is not limited to this aspect.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of processing semantic fragments, the method comprising:

obtaining a plurality of groups of semantic fragments by fragmenting a plurality of data processing flows according to one or more data processing attributes, wherein the semantic fragments are not parts of human language, and wherein each semantic fragment comprises one or more executable code elements corresponding to a data processing flow, the plurality of groups of semantic fragments at least including a first group of semantic fragments generated from a first data processing flow and a second group of semantic fragments generated from a second data processing flow, the first data processing flow being different from the second data processing flow; and merging the first group of semantic fragments and the second group of semantic fragments based on semantic equivalence, wherein semantic equivalence is determined according to similarity of semantic features of the first group of semantic fragments to semantic features of the second group of semantic fragments, wherein the semantic features are selected from the list consisting of a subject of data processing feature, a processing time feature, a processing location feature, a security level feature, and a resource requirement feature.

2. The method according to claim 1, wherein obtaining a plurality of groups of semantic fragments comprises:

partitioning the first data processing flow into the first group of semantic fragments based on semantic features of elements in the first data processing flow.

3. The method according to claim 2, wherein the elements in the first data processing flow include primary elements and auxiliary elements connecting the primary elements, and wherein partitioning the first data processing flow into the first group of semantic fragments comprises:

determining at least one boundary element from the primary elements based on the semantic features of the primary elements;

partitioning the primary elements into different groups based on the at least one boundary element; and partitioning the auxiliary elements to the groups based on connections between the primary elements and the auxiliary elements, to generate the first group of semantic fragments.

4. The method according to claim 2, wherein partitioning the first data processing flow into the first group of semantic fragments comprises:

associating semantic fragments with data flow in the first group of semantic fragments for reconstruction of the first data processing flow.

5. The method according to claim 1, further comprising:

determining similarities between semantic fragments in the first group of semantic fragments and semantic fragments in the second group of semantic fragments, wherein merging the first group of semantic fragment and the second group of semantic fragment based on semantic equivalence comprises: merging the first group of semantic fragments and the second group of semantic fragments based on an order of the similarities.

6. The method according to claim 1, wherein merging the first group of semantic fragment and the second group of semantic fragment based on semantic equivalence comprises:

merging a first semantic fragment in the first group of semantic fragments and a second semantic fragment in the second group of semantic fragments into a third semantic fragment by generating a branch.

7. The method according to claim 6, wherein merging a first semantic fragment in the first group of semantic fragments and a second semantic fragment in the second group of semantic fragments into a third semantic fragment by generating a branch comprises:

responsive to a first element in the first semantic fragment being semantically equivalent to a second element in the second semantic fragment while a first downstream element of the first element in the first semantic fragment being not semantically equivalent to a second downstream element of the second element in the second semantic fragment, merging the first element and the second element into a third element in the third semantic fragment; and using a branch element to insert the first downstream element and the second downstream element into the third semantic fragment as downstream elements of the third element.

8. The method according to claim 7, wherein merging the first element and the second element into a third element in the third semantic fragment comprises:

creating the branch element as the third element.

9. The method according to claim 6, wherein merging a first semantic fragment in the first group of semantic fragments and a second semantic fragment in the second group of semantic fragments into a third semantic fragment by generating a branch comprises:

responsive to a first element in the first semantic fragment being not semantically equivalent to a second element in the second semantic fragment while a first downstream element of the first element in the first semantic fragment being semantically equivalent to a second downstream element of the second element in the second semantic fragment, creating a branch element in the third semantic fragment;

inserting the first element and the second element into the third semantic fragment as downstream elements of the branch element; and merging the first downstream element and the second downstream element into the third semantic fragment as a downstream element common to the first element and the second element.

10. The method according to claim 1, further comprising:

extracting a backbone of at least one of the first data processing flow and the second data processing flow based on a result of the merging.

11. A system for processing semantic fragments, the method comprising:

a fragment obtaining unit configured to obtain a plurality of groups of semantic fragments by fragmenting a plurality of data processing flows according to one or more data processing attributes, wherein the semantic fragments are not parts of human language, and wherein each semantic fragment comprises one or more executable code elements corresponding to a data processing flow, the plurality of groups of semantic fragments at least including a first group of semantic fragments generated from a first data processing flow and a second group of semantic fragments generated from a second data processing flow, the first data processing flow being different from the second data processing flow; and a fragment merging unit configured to merge the first group of semantic fragments and the second group of semantic fragments based on semantic equivalence, wherein semantic equivalence is determined according to similarity of semantic features of the first group of semantic fragments to semantic features of the second group of semantic fragments, wherein the semantic features are selected from the list consisting of a subject of data processing feature, a processing time feature, a processing location feature, a security level feature, and a resource requirement feature.

12. The system according to claim 11, wherein the fragment obtaining unit comprises:

a fragment partitioning unit configured to partition the first data processing flow into the first group of semantic fragments based on semantic features of elements in the first data processing flow.

13. The system according to claim 12, wherein the elements in the first data processing flow include primary elements and auxiliary elements connecting the primary elements, and wherein the fragment partitioning unit comprises:
   a boundary element determining unit configured to determine at least one boundary element from the primary elements based on the semantic features of the primary elements;
   a primary element partitioning unit configured to partition the primary elements into different groups based on the at least one boundary element; and
   an auxiliary element partitioning unit configured to partition the auxiliary elements to the groups based on connection between the primary elements and the auxiliary elements, to generate the first group of semantic fragments.

14. The system according to claim 12, wherein the fragment partitioning unit comprises:
   a fragment associating unit configured to associate semantic fragments with data flow in the first group of semantic fragments for reconstruction of the first data processing flow.

15. The system according to claim 11, further comprising:
   a similarity determining unit configured to determine similarities between semantic fragments in the first group of semantic fragments and semantic fragments in the second group of semantic fragments,
   wherein the fragment merging unit is configured to merge the first group of semantic fragments and the second group of semantic fragments based on an order of the similarities.

16. The system according to claim 11, wherein the fragment merging unit comprises:
   a branch-based merging unit configured to merge a first semantic fragment in the first group of semantic fragments and a second semantic fragment in the second group of semantic fragments into a third semantic fragment by generating a branch.

17. The system according to claim 16, wherein the branch-based merging unit comprises:
   a first element merging unit configured to, responsive to a first element in the first semantic fragment being semantically equivalent to a second element in the second semantic fragment while a first downstream element of the first element in the first semantic fragment being not semantically equivalent to a second downstream element of the second element in the second semantic fragment, merge the first element and the second element into a third element in the third semantic fragment; and
   a first element inserting unit configured to use a branch element to insert the first downstream element and the second downstream element into the third semantic fragment as downstream elements of the third element.

18. The system according to claim 17, wherein the first element merging unit comprises:
   a first branch creating unit configured to create the branch element as the third element.

19. The system according to claim 16, wherein the branch-based merging unit comprises:
   a second branch creating unit configured to, responsive to a first element in the first semantic fragment being not semantically equivalent to a second element in the second semantic fragment while a first downstream element of the first element in the first semantic fragment being semantically equivalent to a second downstream element of the second element in the second semantic fragment, create a branch element in the third semantic fragment;
   a second element inserting unit configured to insert the first element and the second element into the third semantic fragment as downstream elements of the branch element; and
   an element merging unit configured to merge the first downstream element and the second downstream element into the third semantic fragment as a downstream element common to the first element and the second element.

20. The system according to claim 11, further comprising:
   a backbone extracting unit configured to extract a backbone of at least one of the first data processing flow and the second data processing flow based on a result of the merging.

* * * * *